US012678879B2

(12) United States Patent
Wu et al.

(10) Patent No.: US 12,678,879 B2
(45) Date of Patent: Jul. 14, 2026

(54) SURFACE TREATMENT METHOD

(71) Applicant: L'Air Liquide, Societe Anonyme pour l'Etude et l'Exploitation des Procedes Georges Claude, Paris (FR)

(72) Inventors: Wentan Wu, Shanghai (CN); Yunhong Yu, Shanghai (CN); Zhijun Huang, Shanghai (CN)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 18/890,961

(22) Filed: Sep. 20, 2024

(65) Prior Publication Data

US 2025/0091148 A1      Mar. 20, 2025

(30) Foreign Application Priority Data

Sep. 20, 2023    (CN) ......................... 202311221379.4

(51) Int. Cl.
*B23K 1/00*          (2006.01)
*B23K 1/20*          (2006.01)
(52) U.S. Cl.
CPC ............ *B23K 1/206* (2013.01); *B23K 1/0016* (2013.01)
(58) Field of Classification Search
CPC . B23K 1/206; B23K 1/0016; H01L 23/49811; H01L 24/83; H01L 2924/00; H01L 2924/00014; H01L 2924/01006; H01L 2924/01033; H01L 23/3735; H01L 21/4821; H01L 21/4882; H05H 1/42; H05K 3/26; H01J 37/32825

USPC ......... 228/179.1–180.22, 201–202, 205–206
See application file for complete search history.

(56) References Cited

U.S. PATENT DOCUMENTS

| | | | | |
|---|---|---|---|---|
| 4,921,157 | A | * | 5/1990 | Dishon ................. B23K 35/38 204/170 |
| 5,192,582 | A | * | 3/1993 | Liedke ................... B23K 1/008 228/205 |
| 5,609,290 | A | * | 3/1997 | Bobbio .................... B23K 1/20 228/206 |
| 10,032,609 | B1 | * | 7/2018 | Cheng ................... C23C 16/513 |
| 2003/0019917 | A1 | * | 1/2003 | Furuno ................... H01L 24/11 228/246 |

(Continued)

FOREIGN PATENT DOCUMENTS

| | | | | |
|---|---|---|---|---|
| CA | 2253889 A1 * | 5/1999 | .............. C23G 5/00 |
| CN | 103 065 987 | 4/2013 | |

(Continued)

OTHER PUBLICATIONS

EP Search Report and Written Opinion for EP 24199415, mailed Feb. 11, 2025.

*Primary Examiner* — Kiley S Stoner
(74) *Attorney, Agent, or Firm* — Elwood L. Haynes

(57) ABSTRACT

A surface treatment method. Atmospheric plasma is provided, and an object to be treated is placed in an atmospheric plasma atmosphere, wherein a residual oxygen level in the atmospheric plasma atmosphere is lower than a pre-set value. A soldering process is integrated into an atmospheric plasma treatment system without any flux protection, and it is ensured that the oxygen level in the atmosphere is reduced to an extremely low level, which can meet the high requirements for surface soldering performance.

10 Claims, 2 Drawing Sheets

201    202    203    204    205    206

(56)                      References Cited

U.S. PATENT DOCUMENTS

| | | | |
|---|---|---|---|
| 2007/0289955 A1 | 12/2007 | Tsukamoto et al. | |
| 2008/0230591 A1 * | 9/2008 | Wandke .............. | H05K 3/3489 |
| | | | 228/52 |
| 2011/0014785 A1 * | 1/2011 | Shimizu ................. | H01L 24/11 |
| | | | 118/728 |
| 2012/0111925 A1 * | 5/2012 | Diep ..................... | B23K 1/206 |
| | | | 228/205 |
| 2015/0072473 A1 | 3/2015 | Lam et al. | |
| 2020/0343079 A1 * | 10/2020 | Feng ................... | H05H 1/2431 |
| 2023/0049702 A1 * | 2/2023 | Williams ............ | H01J 37/3244 |
| 2025/0091148 A1 * | 3/2025 | Wu ................... | H01J 37/32825 |

FOREIGN PATENT DOCUMENTS

| | | | | |
|---|---|---|---|---|
| CN | 116 160 101 | | 5/2023 | |
| CN | 114951148 B | * | 10/2023 | ........... B08B 7/0035 |
| DE | 4041270 A1 | * | 6/1992 | ............ B23K 1/085 |
| JP | H09148095 A | * | 6/1997 | ............ H01L 24/78 |
| JP | 2002050860 A | * | 2/2002 | ........... H01L 24/743 |
| JP | 2014 075 406 | | 4/2014 | |
| JP | 5666246 B2 | * | 2/2015 | ............ H01L 24/27 |
| WO | WO-9719204 A1 | * | 5/1997 | .............. B23K 1/20 |
| WO | WO-0017923 A1 | * | 3/2000 | ....... H01L 21/67138 |
| WO | WO-0141963 A3 | * | 2/2002 | |
| WO | WO 02/103770 | | 12/2002 | |

* cited by examiner 101
102
103

201    202     203      204     205     206

SURFACE TREATMENT METHOD

CROSS-REFERENCE TO RELATED APPLICATIONS

This application claims the benefit of priority under 35 U.S.C. § 119 (a) and (b) to Chinese patent application No. CN 202311221379.4, filed Sep. 20, 2023, the entire contents of which are incorporated herein by reference.

TECHNICAL FIELD

The present application belongs to the field of semiconductor manufacturing. The present application relates to a surface treatment method, and specifically to a method of performing surface cleaning using plasma.

BACKGROUND ART

The manufacturing process of semiconductor elements requires the use of soldering technology. Common objects to be treated are often certain metal materials, and these metal materials are easily oxidized in the presence of oxygen. The oxide film formed after oxidation can lead to bonding defects, such as poor wet spreadability, poor bonding performance, and increased voids. Moreover, once the metal materials melt under high temperature conditions, the oxide film will further become thicker. The thickened oxide film is mixed between bonded objects after bonding, which will cause poor conduction.

Currently, a commonly used soldering process is flux soldering. Although flux can reduce the surface tension of the object to be treated and remove the oxide film on the surface of the object to be treated, different types of flux still have inevitable disadvantages. One disadvantage of flux soldering is the formation of corrosive flux residue around solder spots, which can lead to long-term reliability issues and is disadvantageous in terms of heat exchange. Another disadvantage of flux soldering is the problem of internal voids. Due to the evaporation and vaporization of flux, internal voids are almost inevitable. In order to reduce internal voids and flux residue, a vacuum reflow oven is used to suck away the flux residue. However, the vacuum process has the following disadvantages: First, some components will degas excessively in the vacuum, and thus a target vacuum pressure needs to be reached very slowly. Second, heat cannot be transferred in the vacuum through convection, but can only be transferred through infra-red radiation or thermal conduction. Third, the price of vacuum equipment is very expensive. For example, according to the quotation of "Torch Technology Co., Ltd", the price of vacuum equipment is 6 to 7 times that of non-vacuum equipment.

Since soldering requires high soldering activity on the metal surface, the treatment of the metal surface is particularly important. Taking an insulated gate bipolar transistor (IGBT) as an example, it is widely used in many high-power scenarios, such as wind power generation, high-speed rail, electric vehicles, ships, etc. The trend in IGBT applications is towards greater power density, higher switching frequency and smaller volume. Therefore, the reliability of IGBT is crucial. Moreover, the voids that inevitably appear during the soldering process will seriously affect the reliability of the IGBT during operation. A typical IGBT package module is shown in FIG. 1. In the figure, 101 represents a primary soldering layer, 102 represents DBC, 103 represents a secondary soldering layer, 104 represents an insulating layer, 105 represents bond copper, and 106 represents a heat dissipation substrate. The main function of the heat dissipation substrate is to quickly transfer the heat generated during the IGBT switching process. The heat dissipation substrate is usually made of copper. The thickness of the heat dissipation substrate is usually 3 to 8 mm. The main function of direct bond copper (DBC) is to ensure the electrical insulation, thermal conductivity and current transmission capabilities between a chip and the heat dissipation substrate. The soldering between the chip and the DBC is referred to as primary soldering. Due to further requirements for heat dissipation, the DBC will be directly soldered on the heat dissipation substrate, which is referred to as secondary soldering. The secondary soldering has a larger soldering area than the primary soldering, and more voids may thus be produced. For some extremely demanding industries such as the new energy field, the individual void ratio of IGBT should be less than 1%, and the overall void ratio should be less than 1.5%. It can be seen that ensuring a stable and low void ratio is an urgent requirement for IGBT module packaging.

In view of this, how to design a new surface treatment method to eliminate the above-mentioned defects and deficiencies in the prior art and realize the high requirements for soldering quality in certain technical fields is an urgent issue for a person skilled in the art to solve.

SUMMARY OF THE INVENTION

The present application relates to a surface treatment method. In particular, the present application relates to an improved method for cleaning a metal surface without using flux and organic solderability preservatives (OSP), so that the object to be treated meets reliability requirements after soldering. This improved method of the present application comprises using atmospheric plasma to treat the metal surface.

In order to achieve the above-mentioned purpose of the invention, a surface treatment method is disclosed in the present application, comprising steps of:

providing atmospheric plasma, and placing an object to be treated in an atmospheric plasma atmosphere, wherein a residual oxygen level in the atmospheric plasma atmosphere is lower than a pre-set value.

According to another aspect of the present application, the atmospheric plasma is generated by supplying argon, helium, hydrogen, nitrogen, or a combination thereof.

According to another aspect of the present application, the atmospheric plasma is generated by supplying argon and hydrogen, or nitrogen and hydrogen.

According to another aspect of the present application, the hydrogen accounts for 1% to 10% of the volume of the atmospheric plasma, and preferably, the hydrogen accounts for 1% to 4% of the volume of the atmospheric plasma.

According to another aspect of the present application, the pre-set value is 200 ppm, preferably 100 ppm, more preferably 50 ppm, and most preferably 10 ppm.

According to another aspect of the present application, a surface of the object to be treated is not coated with an organic solderability preservative.

According to another aspect of the present application, the surface treatment method further comprises a step of: after atmospheric plasma treatment, the object to be treated entering a soldering system, wherein no flux is used in the soldering system.

According to another aspect of the present application, the atmospheric plasma sweeps the object to be treated at a speed of 10 mm/s to 300 mm/s, preferably 25 mm/s to 150 mm/s, and more preferably 25 mm/s to 100 mm/s.

According to another aspect of the present application, the treatment method causes a void ratio of a surface of the object to be treated to be less than 1%.

According to another aspect of the present application, the atmospheric plasma is generated by an atmospheric plasma generator, and the atmospheric plasma generator comprises a plasma spray torch having a series of nozzles arranged in such a manner that the object to be treated can be covered by the atmospheric plasma atmosphere.

According to another aspect of the present application, the atmospheric plasma is emitted vertically or obliquely to a surface of the object to be treated.

The technical solution provided by the present application is especially applicable to large-area metal surface soldering in high-demand fields, such as IGBT, and has the following advantages:

(1) This is an environmentally friendly solution that does not require the use of environmentally unfriendly and health-damaging compounds such as flux and formic acid.

(2) Plasma treatment leaves no residue, avoiding reliability hazards caused by flux or formic acid residues.

(3) Plasma treatment of the surface can greatly reduce the void ratio and significantly reduce the internal voids on the metal surface.

(4) Compared with the vacuum plasma method, the method of the present application allows the process flow to be integrated into the same assembly line without causing interruption of the assembly line. Moreover, the vacuum plasma method requires the DBC and heat dissipation substrate to be placed into the vacuum chamber in batches. This process will inevitably expose the cleaned DBC surface to the oxygen atmosphere, aggravating surface oxidation and causing interruption of the assembly line.

BRIEF DESCRIPTION OF THE DRAWINGS

The advantages and spirit of the present application can be further understood from the following detailed description of the invention and the accompanying drawings.

DETAILED DESCRIPTION OF THE INVENTION

Figure 1:
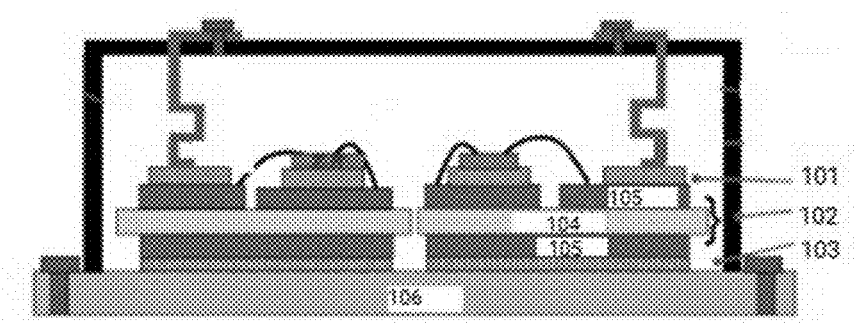
FIG. 1 shows a typical IGBT package module.

Specific embodiments of the present application are described in detail below with reference to the accompanying drawings. However, it should be understood that the present application is not limited to the implementations described below, and the technical concept of the present application may be implemented in combination with other well-known techniques or other technologies having the same functions as those well-known techniques.

In the description of the specific embodiments below, in order to clearly show the structure and manner of operation of the present application, many directional terms will be used for description, but terms such as "front," "rear," "left," "right," "outer," "inner," "outward," "inward," "axial," "radial," etc. should be understood to be terms of convenience rather than restrictive terms.

In the explanation of particular embodiments below, it must be understood that orientational or positional relationships indicated by terms such as "length," "width," "up," "down," "front," "rear," "left," "right," "vertical," "horizontal," "top", "bottom," "inner" and "outer" are based on the orientational or positional relationships shown in the drawings, and are merely intended to facilitate and simplify the description of the present application, without indicating or implying that the device or element referred to must have a specific orientation or be constructed and operated in a specific orientation, and therefore should not be understood as limiting the present application.

In addition, the terms "first" and "second" are only used for descriptive purposes rather than limiting chronological order, quantity, or importance, should not be construed as indicating or implying relative importance or implicitly specifying the number of technical features indicated, and are only intended to differentiate one technical feature from another technical feature of the present technical solution. Thus, the features defined with "first" and "second" may explicitly or implicitly include one or more features. In the description of the present application, "multiple" means two or more, unless otherwise expressly and specifically specified. Similarly, a qualifier like "a" appearing herein does not indicate the definition of quantity, but describe a technical feature that has not appeared in the preceding text. Similarly, unless modified by a specific quantity measure word, nouns herein should be regarded as including both singular and plural forms, i.e. the technical solution may include a single one of the technical feature concerned, but may also include a plurality of the technical feature. Similarly, modifiers similar to "approximately" and "about" appearing before numerals herein usually include the numeral, and the specific meaning should be understood in light of the context.

It should be understood that in the present application, "at least one (item)" means one or more, and "a plurality of" means two or more. The expression "and/or" is used to describe the associative relationship between associated objects, and indicates that three types of relationship may exist; for example, "A and/or B" can mean three situations, namely that A alone is present, B alone is present, and A and B are both present, wherein A and B may be singular or plural. The symbol "/" generally means that the preceding and following associated objects have an "or" relationship. The expression "at least one of the following (items)" or similar means any combination of these items, including a single (item) or any combination of multiple (items). For example, at least one (item) of a, b or c can mean: a, b, c, "a and b," "a and c," "b and c," or "a and b and c", wherein a, b and c may be singular or plural.

The terms "unit," "member," "object" and "module" described herein indicate units used to process at least one function and operation, and can be implemented by means of hardware components or software components and combinations thereof.

Unless clearly indicated otherwise, each aspect or embodiment defined herein may be combined with any other aspect(s) or embodiment(s). In particular, any preferred or advantageous feature indicated can be combined with any other preferred or advantageous feature indicated.

Explanation of Terms

As used herein, plasma, also referred to as electric plasma, is an ionized gas-like substance composed of positive and negative ions produced by ionization of atoms and atomic groups after some electrons have been stripped away. The motion of plasma is mainly dominated by electromagnetic forces and exhibits significant behaviour en masse. Atmospheric plasma refers to electric plasma generated at or near one atmosphere. Both atmospheric plasma and vacuum plasma have high-energy particles, but the atmospheric plasma does not require the provision of a closed reaction chamber and vacuum pumping system like vacuum plasma. Therefore, atmospheric plasma saves a huge vacuum chamber and vacuum pump compared with vacuum plasma, and has an absolute advantage in equipment cost. The surface treatment temperature in the present application may be in the range of about 25° C. to about 150° C. The plasma may optionally include at least one gas selected from argon, helium, nitrogen, hydrogen or a combination thereof. In some non-limiting implementations, the hydrogen may account for 1% to 10% of the volume of the atmospheric plasma, preferably about 2% to 8%, and more preferably more than 4% to 7%.

As used herein, the contact of the atmospheric plasma with a surface to be treated may be accomplished by any suitable means, such as using a plasma jet to sweep the surface. The sweep speed may be varied as needed to target the efficiency required for a specific process. For example, the sweep speed may be in the range of about 1 to about 500 mm/s, such as about 10 to about 300 mm/s, 25 to 300 mm/s, 25 to 250 mm/s, 25 to 150 mm/s, 50 to 150 mm/s, and 50 to 100 mm/s, including all ranges and sub-ranges therebetween.

Likewise, the length of time that the atmospheric plasma is in contact with the surface to be treated, which may be referred to as residence time, may vary with the sweep speed and the desired surface properties. As a non-limiting example, the residence time may be in the range of 1 second to several minutes, such as about 1 second to about 20 minutes, about 10 seconds to about 10 minutes, about 30 seconds to about 9 minutes, about 1 minute to about 8 minutes, about 2 minutes to about 7 minutes, about 3 minutes to about 6 minutes, or about 4 minutes to about 5 minutes, including all ranges and sub-ranges therebetween.

As used herein, the device used to generate plasma in the present application may use an OpenAir™ plasma spray torch or an Atomflo™ plasma machine. Specifically, reconstructed treatment parameters can be accurately evaluated according to the sweep speed and the distance from the plasma torch to the surface to be treated.

As used herein, natural oxidation (NO) refers to exposing the object to be treated to air for two weeks at room temperature to simulate the effect of natural oxidation of the object to be treated during the transfer process.

As used herein, deep oxidation (DO) refers to placing the DBC cleaned with citric acid in a nitrogen atmosphere of 250° C. and 50 ppm for 10 minutes to simulate the surface condition of the DBC after the first soldering during IGBT packaging.

In an implementation, the atmospheric plasma is generated by supplying argon, helium, hydrogen, nitrogen, or a combination thereof, such as argon and hydrogen, nitrogen and hydrogen, helium and hydrogen, etc.

As used herein, "clean surface", "surface cleaning", "cleaning" and the like refer to cleaning of organic and inorganic contaminants on the surface to be treated so that more effective and stronger mechanical and electrical connections are produced between metal materials.

As used herein, solder spot analysis may be performed using X-ray inspection techniques known in the art. X-rays can penetrate inside the package and directly inspect the quality of solder spots.

The following embodiments take the treatment of contaminants and oxide films on a DBC surface during the IGBT packaging process as an example. In a nitrogen atmosphere, this embodiment uses atmospheric plasma to treat the DBC surface instead of other chemical methods.

A solder used in flux soldering is Sn305, and its melting point is 217° C.

Because the surface of DBC is usually copper, that is easily oxidised. An organic solderability preservative is a common protection means in the prior art. The OSP is a layer of organic copper complex film grown on the surface of copper by using a chemical method. Although the OSP is cheap and has good solderability initially, after being used for a period of time, its solderability deteriorates significantly, its shelf life is insufficient, and it is prone to surface dis-colouration, uneven film thickness, excessive film thickness (too thick or too thin), and other issues. If there is a hole in the OSP just on the copper surface, the copper surface will start to oxidise from the hole, resulting in poor assembly. Moreover, the thicker the OSP, the better it protects the copper foil. However, correspondingly, it also requires a more active flux to remove the OSP.

In this embodiment, on the premise that the surface of the DBC is not coated with any organic solderability preservative while no flux is used, atmospheric plasma is used to perform surface treatment of the object to be treated, and the requirements for wet spreadability and void ratio are reached.

Figure 2:
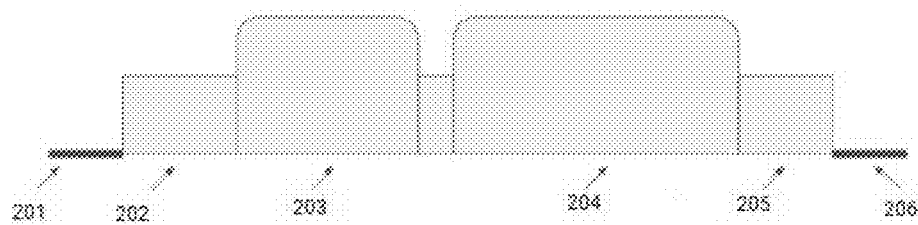
FIG. 2 shows a flow chart of treating a surface with atmospheric plasma in an embodiment of the present application.

In this embodiment, the process of surface treatment using atmospheric plasma is shown in FIG. 2. An object to be treated moves towards a reflow soldering device by means of a conveyor device. An atmospheric plasma treatment chamber is placed before the reflow soldering device and can provide an atmospheric plasma atmosphere. Here, any known plasma generator may be used to provide the atmospheric plasma atmosphere, such as a plasma spray torch or the like. A typical plasma spray torch includes a series of nozzles arranged in such a manner that a region to be treated can be ensured to be covered by the plasma atmosphere. The arrangement of the nozzles is freely chosen by those skilled in the art.

As shown in FIGS. 2, 201 and 206 represent carrying platforms for placing and fixing the object to be treated. The entire atmospheric plasma treatment system includes transition chambers 202 and 205, an atmospheric plasma treatment chamber 203 and a reflow soldering chamber 204. Among them, the transition chambers 202 and 205 and the atmospheric plasma treatment chamber 203 need to use an inert gas (such as nitrogen) to replace the air to maintain a required residual oxygen level. The atmospheric plasma treatment chamber 203 is equipped with an atmospheric plasma generator, wherein the atmospheric plasma generator is connected to a gas source through a pipeline. A reflow soldering process is completed in the reflow soldering chamber 204. A specific reflow soldering process may be performed according to a method well known to those skilled in the art, and is not limited in the present application.

The atmospheric plasma generator in the atmospheric plasma treatment chamber 203 can generate any gas suitable for surface treatment, such as nitrogen, argon, helium or their mixtures with hydrogen.

It was unexpectedly discovered that the residual oxygen level (ROL) in the entire working environment of the above-mentioned atmospheric plasma treatment system must be lower than a pre-set value. In previous studies, the extent to which residual oxygen levels need to be reduced had not been fully realized. It is expected that the lower the residual oxygen level, the more ideal it is, that is, the closer it is to 0 ppm, the more ideal it is. Therefore, the residual oxygen level needs to be lower than 300 ppm, preferably lower than 200 ppm, more preferably lower than 100 ppm, optimally lower than 50 ppm, even lower than 10 ppm, or even 5 ppm. An oxygen analyser is configured in the atmospheric plasma treatment chamber to monitor the residual oxygen level. As an example, a fuel cell oxygen analyser may be used.

As an example, a nitrogen atmosphere may be utilized to protect the entire work environment. Initially, the atmosphere of the working environment is replaced with nitrogen. After the ROL is reduced to about 200 ppm, the ROL may be quickly reduced to, for example, 10 ppm or less by continuing to use nitrogen for replacement or using the combustion of the hydrogen-containing plasma to consume the remaining oxygen.

In this embodiment, the soldering temperature in the reflow soldering chamber is set to 250° C.

The sweep speed range of the plasma spray torch may be estimated. A sweep speed that is too fast cannot provide sufficient plasma intensity, while a sweep speed that is too slow may result in too high temperatures and too few units per hour (UPH). As an example, the sweep speed of the plasma spray torch may be between 10 and 250 mm/second. In other words, the plasma treatment time per unit area (inversely proportional to the sweep speed) should be optimized. Long-term treatment will cause the surface temperature of the DBC to rise sharply and cause re-oxidation. However, short-term treatment cannot remove the oxide film on the DBC surface. Even a thin oxide film may cause soldering failure, which is undesirable.

Surface wettability is an indicator of whether the soldering is good. If there are any firmly attached contaminants (such as oxide films) on the surface to be treated, they will act as a barrier to metal connections and thus hinder surface wettability. Solder spots may not be standard circles, so it is difficult to directly measure the contact angles of the solder spots on the metal surface. The area of solder spots will be used below to evaluate surface wettability. The larger the area of the solder spots and the fuller and more uniform the solder spots are, the better the surface wettability will be.

Figure 3A:
FIGS. 3a, 3b and 3c show schematic diagrams of solder spots on DBC of a plasma spray torch in an embodiment of the present application at different sweep speeds and different ROLs, respectively.
Figure 3B:
Figure 3C:
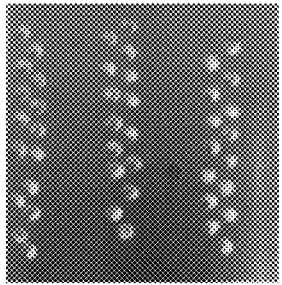

According to the process shown in FIG. 2, the DBC was treated at different sweep speeds and different ROLs, and the solder spot images of FIGS. 3a, 3b and 3c were obtained. As shown in FIG. 3a, the ROL in the atmospheric plasma treatment chamber was maintained to be lower than 5 ppm, and the sweep speed of the plasma spray torch was 25 mm/s. In FIG. 3b, the ROL in the atmospheric plasma treatment chamber was in the range of approximately 130 to 180 ppm, and the sweep speed of the plasma spray torch was 25 mm/s. In FIG. 3c, the ROL in the atmospheric plasma treatment chamber was maintained to be lower than 5 ppm, and the sweep speeds of the plasma spray torch were, from left to right, 150 mm/s, 100 mm/s and 50 mm/s, respectively.

A lower sweep speed means a longer treatment time and a greater likelihood of achieving good surface wettability. However, the solder spots in FIG. 3b show severe shrinkage. The possible explanation is that due to the higher ROL, the reoxidation process occurred on the treated surface in FIG. 3b. Unexpectedly, as shown in FIG. 3c, the solder spots obtained at a faster sweep speed were uniform and full. It is generally believed that an excessively fast sweep speed will result in insufficient treatment time for the DBC surface. However, the results of the present application show that when the ROL is low enough, since the oxygen is always very thin, the effect of the sweep speed is not obvious.

Internal voids are another important evaluation criterion for whether the soldering is good. The following two indicators will be considered. The first one is a void ratio, which represents the area of all voids in a target region divided by the area of all solder spots. The second indicator is a ratio of solder spots with voids, which represents the number of solder spots with voids divided by the number of all solder spots.

To this end, using deeply oxidised DBC as a soldering base material, the inventors compared the void ratios of solder spots after flux soldering and atmospheric plasma treatment. The results are shown in Table 1 below. In flux soldering, the flux model number is SAC305 (purchased from Shanghai Huaqing Welding Materials Technology Co., Ltd.), the flux proportion is 0.2% to 5%, and the activity level is ROLO. Atmospheric plasma treatment is performed in an atmosphere with a ROL lower than 50 ppm. Each group is set with 75 solder spots. Among the solder spots with voids, the solder spots with the fewest voids and the solder spots with the most voids are selected as examples, as shown in FIGS. 4a to 4d.

TABLE 1

Figure 4A:
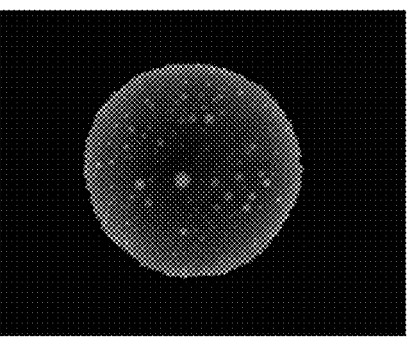
FIGS. 4a, 4b, 4c and 4d show schematic diagrams of solder spots with voids obtained after flux soldering and atmospheric plasma treatment, respectively.
Figure 4B:
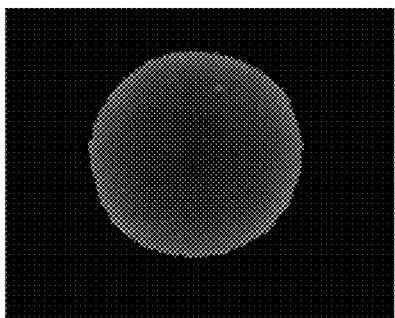
Figure 4C:
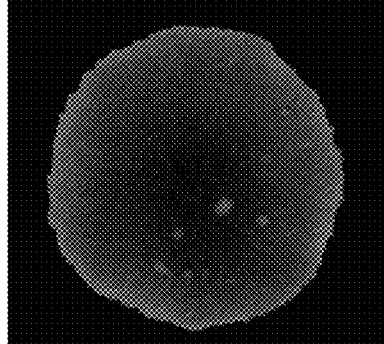
Figure 4D:
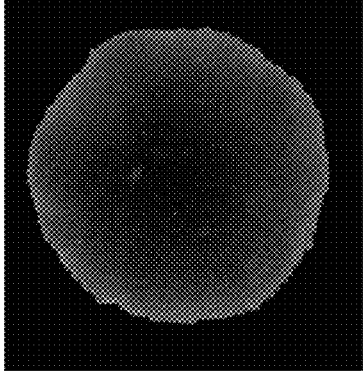

| | Solder spots with the fewest voids | Solder spots with the most voids | Ratio of solder spots with voids | Void ratio |
|---|---|---|---|---|
| Flux soldering | FIG. 4b | FIG. 4a | 100% | 2.7% |
| OpenAir | FIG. 4d | FIG. 4c | 14.76% | 0.95% |

Table 1 shows that compared with flux soldering, atmospheric plasma treatment can significantly reduce the void ratio and ratio of solder spots with voids. After flux soldering, 100% of the solder spots had voids, and the average void ratio was 2.7%. However, the DBC treated with atmospheric plasma had a greatly reduced void ratio, and the quality of solder spots was higher.

Therefore, plasma treatment showed better performance not only in terms of the void ratio but also in terms of the number of voided solder spots. This means that flux soldering can lead to a rapid increase of voids if the soldering area is increased, which is not the case with atmospheric plasma treatment. The present application provides a new surface treatment method. The soldering process is integrated into the atmospheric plasma treatment system without any flux protection, and it is ensured that the oxygen level in the atmosphere is reduced to an extremely low level, which can meet the high requirements for surface soldering performance.

Described in the description are merely preferred specific embodiments of the present application, and the above embodiments are merely used to explain the technical solution of the present application without limiting the present application. All technical solutions obtainable by those skilled in the art by logical analysis, reasoning or limited experiment according to the concept of the present application should be within the scope of the present application.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A surface treatment method using an atmospheric plasma treatment system comprising carrying platforms for placing and fixing an object to be treated, transition chambers, an atmospheric plasma treatment chamber, and a reflow solder chamber, the method comprising:

providing atmospheric plasma, and placing an object to be treated in an atmospheric plasma atmosphere, wherein the transition chambers and the atmospheric plasma chamber use an inert gas to replace the air and to maintain a required residual oxygen level wherein the residual oxygen level in the atmospheric plasma atmosphere is lower than a pre-set value of 50 ppm, and wherein the atmospheric plasma sweeps the object to be treated at a speed of 10 mm/s to 300 mm/s.

2. The surface treatment method according to claim 1, wherein the atmospheric plasma is generated by supplying argon, helium, hydrogen, nitrogen, or a combination thereof.

3. The surface treatment method according to claim 2, wherein the atmospheric plasma is generated by supplying argon and hydrogen, or nitrogen and hydrogen.

4. The surface treatment method according to claim 3, wherein the hydrogen accounts for 1% to 10% of the volume of the atmospheric plasma.

5. The surface treatment method according to claim 1, wherein the pre-set value is 10 ppm.

6. The surface treatment method according to claim 1, wherein a surface of the object to be treated is not coated with an organic solderability preservative.

7. The surface treatment method according to claim 1, further comprising a step of: after atmospheric plasma treatment, the object to be treated entering a soldering system, wherein no flux is used in the soldering system.

8. The surface treatment method according to claim 1, wherein a void ratio of a surface of the object to be treated is less than 1%.

9. The surface treatment method according to claim 1, wherein the atmospheric plasma is emitted vertically or obliquely to a surface of the object to be treated.

10. The surface treatment according to claim 5, wherein the pre-set value is 5 ppm.

* * * * *